United States Patent [19]

Hagen

[11] 4,168,937
[45] Sep. 25, 1979

[54] ICE RAKE WITH AUTOMATIC LEVELING HOIST

[75] Inventor: William F. Hagen, Argyle, Tex.

[73] Assignee: Turbo Refrigerating Company, Denton, Tex.

[21] Appl. No.: 858,538

[22] Filed: Dec. 8, 1977

[51] Int. Cl.² .................................................. B65G 65/36
[52] U.S. Cl. ..................................... 414/298; 414/313; 254/178; 187/94
[58] Field of Search ............... 214/17 DB, 17 C, 394, 214/396; 254/178, 144; 187/94, 20, 8.59

[56] References Cited

U.S. PATENT DOCUMENTS

| | | | |
|---|---|---|---|
| 1,698,209 | 1/1929 | Barlow | 187/94 X |
| 2,481,037 | 9/1949 | Pringle | 254/178 |
| 2,511,246 | 6/1950 | Chamberlin | 214/17 DB X |
| 3,490,620 | 1/1970 | Patz | 214/17 DB |
| 3,690,617 | 9/1972 | Butler | 254/178 X |
| 3,842,993 | 10/1974 | Hagen | 214/17 DB |

*Primary Examiner*—Albert J. Makay
*Attorney, Agent, or Firm*—McDougall, Hersh & Scott

[57] ABSTRACT

An ice rake and hoist are disclosed. The ice rake is suspended over an ice storage bin by two pairs of cables, one pair on each side of the rake. The cables of each pair are joined together and connected to a chain which passes over a sprocket for connection to a counterweight and winch. Both sprockets are provided on a common shaft to insure that the ice rake remains level during movement of ice into and out of the storage bin.

2 Claims, 4 Drawing Figures

ICE RAKE WITH AUTOMATIC LEVELING HOIST

BACKGROUND OF THE INVENTION

This invention relates to the manufacture of ice in bulk, and more particularly to apparatus for the manufacture, storage, and dispensing of large quantities of ice.

A variety of apparatus for use in the manufacture of large quantities of ice are now known to those skilled in the art. Representative ice-making machines are described in U.S. Pat. Nos. 3,074,252, 3,190,083, 3,246,481, 3,546,896, 3,587,241, and others. Commercial installations for the manufacture of ice, and particularly fragmented ice, generally include ice-making machines which actually form the ice and which are elevated above a bin, such as on a second floor of the installation. The ice makers discharge fragmented ice into a conveyor which in turn discharges the ice through an opening into the bin.

However, the automatic and sanitary handling of bulk, fragmentary ice once it is discharged into such a bin presents exceedingly difficult and specialized problems. Fragmented ice, when stored in a bin, can change characteristics during storage. For example, flakes of thin ice tend to break into smaller pieces akin to snow. Under certain temperature conditions, pieces of ice can fuse together. In addition, portions of ice in the lower part of a pile tend to fuse under the weight of a pile.

As a result of the foregoing, fragmented ice in bulk cannot be regarded as being made up of discrete particles and is not even a product having definite handling properties. Fragmentary ice in bulk has no definite angle of repose. Consequently, fragmentary ice in bulk form is virtually incapable of flowing out of a large bin by gravity.

The inability of fragmented ice in bulk to flow with gravity has been previously recognized, and the art has sought to employ a device known as an ice rake to facilitate the handling of ice. An ice rake is a type of drag conveyor which contacts the top of a pile of the ice and is maintained in contact therewith by a system of cables of which the rake is suspended. The ice rake has been found to be the only mechanism for use in the handling and storage of bulk fragmentary ice.

In my prior U.S. Pat. Nos. 3,842,993 and 3,797,267, there is disclosed an improved ice rake for use in large ice making systems. The ice rake there disclosed employs a sophisticated control system for activating the ice rake and for raising and lowering it to predetermined levels for selected time periods thereby to accurately control the movement of ice within the ice bin associated therewith. The present invention discloses a simplified and low cost ice rake for use in smaller systems. A large part of the cost of an ice rake system is in its electrical control system and by reducing the automatic capabilities of the system and by the use of certain mechanical inventions disclosed herein it is possible to produce a manually operated ice rake having a hoist with automatic leveling which is both effective and low in cost.

It is accordingly an object of the invention to provide an ice rake which is low in cost and effective for moving ice within a storage bin during loading and unloading of the bin.

Another object of the invention is to provide an ice rake having a manually operated hoist including an automatic leveling feature to maintain the ice rake in a substantially level condition regardless of the height of the ice piles across the bin.

Another object of the invention is to provide a low cost manual hoist for an ice rake which is counterbalanced to permit accurate control of the amount of pressure applied by the ice rake to the ice contained within the bin.

Other objects and advantages of the invention will be apparent from the remaining portion of the specification.

PRIOR ART STATEMENT

In accordance with the provisions of CFR § 1.97 et seq., applicant provides the following information. The closest prior art of which the applicant is aware are U.S. Pat. Nos. 3,842,993 and 3,797,267. These two patents, assigned to the assignee of the present invention, relate to ice rakes and a control system for an ice rake. The U.S. Pat. No. 3,842,993 patent teaches an improved ice rake construction while the U.S. Pat. No. 3,797,267 patent, which is a continuation-in-part of the U.S. Pat. No. 3,842,993 patent, teaches an automatic control system for an ice rake. The control system of the U.S. Pat. No. 3,797,267 patent includes means for reversing the direction of the ice rake and for raising and lowering it in response to certain conditions of ice in the ice bin.

DETAILED DESCRIPTION

Figure 1:
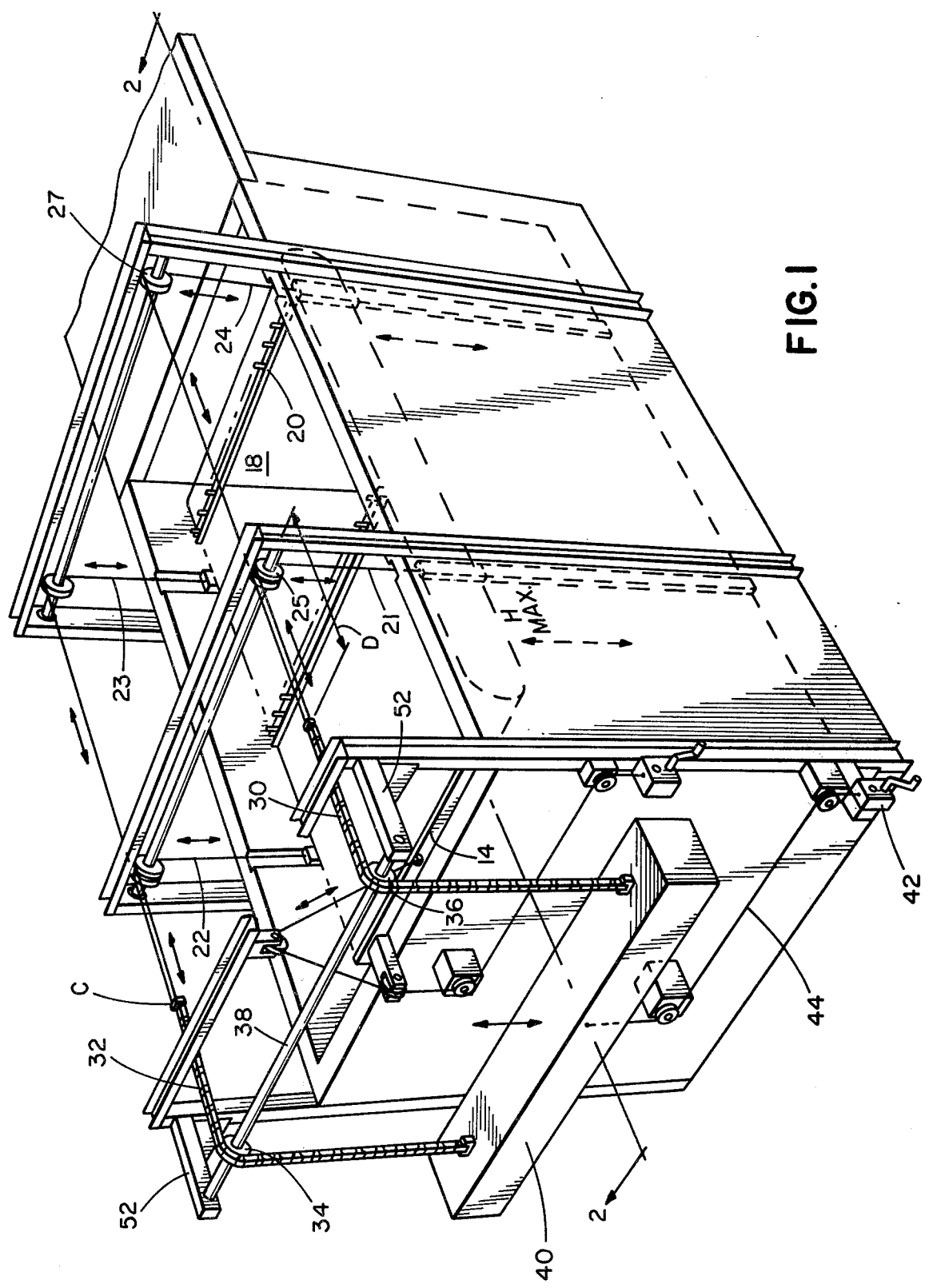
FIG. 1 is a perspective view of the invention.
Figure 2:
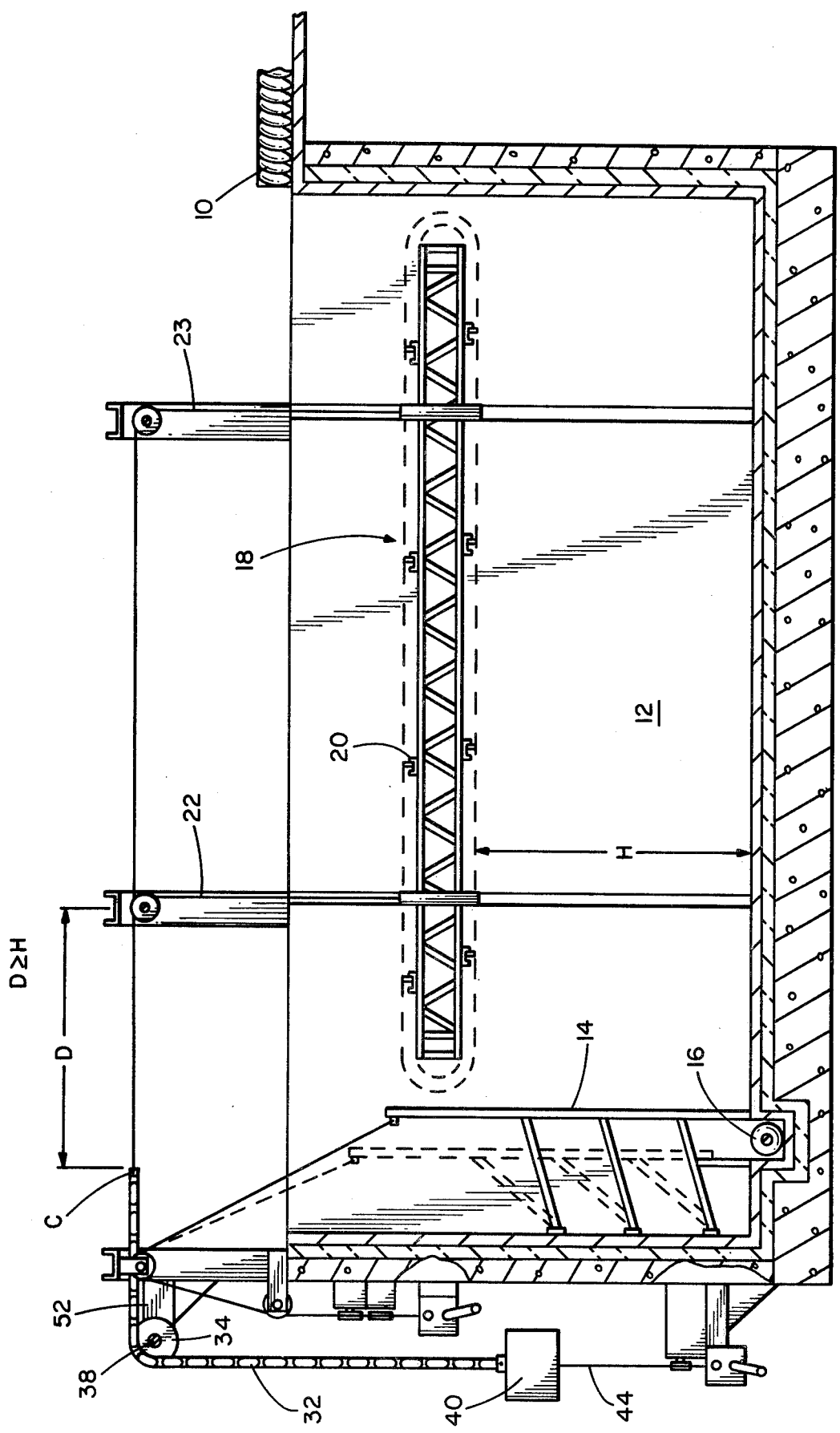
FIG. 2 is a side elevation view of the invention.

Referring to the drawings and in particular FIG. 1, the ice rake according to the invention is disclosed. Ice produced by an ice making machine is discharged therefrom by a screw conveyor 10 into the ice storage bin 12. Ice is discharged from the storage bin by opening door 14 to permit ice to pass onto another screw conveyor 16. As will be appreciated, ice passing into the bin 12 initially accumulates at the rear of the bin and in order to move the accumulated ice towards the door 14 an ice rake 18 is employed. The ice rake 18 is essentially a frame member having one or more motor driven endless belts provided on the frame and including a plurality of flites fixed to the belts. As indicated schematically in FIG. 2, the belt carries a number of flites which preferably include U-shaped channel members 20 extending transversely of the frame to engage the ice piles in the bin. The ice rake is suitably of the type disclosed in my prior U.S. Pat. Nos. 3,842,993 and 3,797,267 which patents are hereby incorporated by reference.

For large ice making and storage systems the movement of the ice rake 18 within the bin 12 is controlled by use of an automatic control system as indicated previously. For smaller systems, for example, storage systems of less than 60 tons, a fully automated system is costly. Accordingly, the present invention provides a simplified manual system wherein the ice rake 18 is supported in the bin by means of four cables, two on either side. Each of the four flexible cables 21 through 24 run vertically upward from the ice rake over a corresponding pulley, such as pulleys 25 and 27, and then towards one end of the storage bin.

For a purpose to be explained, the cables on each side of the device are joined together. Thus, cables 21 and 24 are connected together and in turn to a chain segment 30 at point C. Cables 22 and 23 are similarly connected to a chain drive 32. The point C is spaced from the closest pulley, in this case pulley 25, by a distance (D) greater than the maximum ice height (H) which the bin can accommodate. The chain segments 30 and 32 pass over a pair of sprockets 34 and 36 secured on a common shaft 38. The two chain segments are connected to a counterweight 40 which in turn is connected to a winch 42 which may be manual or power driven as desired. Thus, whenever it is desired to raise or lower the ice rake 18 the winch is operated to play out or take up the cable 44 connecting it to the counterweight 40. This insures the simultaneous and equal movements of cables 21 through 24. Thus, the ice rake can be raised and lowered between the bottom of the bin and the maximum ice height (H) while always maintaining the ice rake level.

By virtue of the cables on each side being connected to a single chain segment and by virtue of the use of common sprocket shaft 38 the self-leveling feature of the invention is achieved. The shaft 38 rotates in bearings provided on the frame 52.

From the foregoing operation of the device according to the invention should be apparent. However, for the sake of completeness, a brief operational summary is provided along with an indication of the importance of the weight differential between the ice rake 18 and the counterweight 40. To begin filling the ice bin 12 the counterweight 40 is lowered by operation of the winch 42 thus raising the ice rake 18 to its uppermost position in the bin. Ice is then admitted at the rear of the bin by means of the feed screw 10. The ice rake operates intermittently during filling of the bin in a manner described in my aforementioned patents. Initially the ice will fall freely down through the ice rake and form a pile at the rear of the bin. When the height of the ice pile reaches the level of the rake the moving flites on the bottom side of the rake will drag the ice forwardly in the bin. Thus, the height of the rake establishes the maximum height of the ice in the bin. As additional ice is received the ice pile is progressively moved at a generally constant height towards the front of the ice bin. When the entire bin has been filled with ice feeding is stopped either manually or upon the detection of an electrical signal generated by a microswitch 54 strategically located in the bin.

To unload ice from the bin the ice door 14 is retracted to expose the screw conveyor 16. Unloading commences when the ice rake is placed in a "free spool" condition. That is, the winch 42 is released so that the ice rake is supported on the ice pile in the bin 12. As the rake operates to move ice out of the bin the weight of the rake keeps it continuously in contact with the top portion of the pile to continuously feed ice to the conveyor 16. The weight of the rake on the ice is equal to the rake weight less the weight of the counterweight, ignoring system friction.

Due to the particular nature of handling fragmentary ice it is necessary that the equipment described herein be made of dense materials. Hence the rake is excessively heavy and must be counterbalanced in order to achieve proper operation. For example, an ice rake for a 10 foot wide by 20 foot long ice bin will weigh on the order of 2,600 pounds. To effect efficient removal of ice from a bin of that size at desirable rates requires that the ice rake apply a force on the ice of approximately 300 pounds. By proper selection of the counterweight the necessary offset can be achieved for efficient operation. In the example given a counterweight on the order of 2,300 pounds would be selected. The use of the counterweight permits control of the force of the rake on the ice while at the same time eliminating the need for a control circuit and powered lowering mechanism.

An important point which should be recognized is that during the "free spooling" condition when ice is being emptied from the bin there is a tendency for the ice rake to tip. This is due to the variation in the consistency or hardness of the ice at various locations across the bin. Thus, as the rake descends into the pile the resistance of the ice pile against the rake will vary at different points. If the rake were not supported by cables commonly connected in the manner described, including the chain segments locked to a common shaft, the rake would not be selfrighting. By connecting the cables on each side of the rake together and by then establishing a fixed relationship between the cables on each side by use of the common sprocket shaft the rake is maintained in a level condition during descent in the "free spool" condition.

Figure 4:
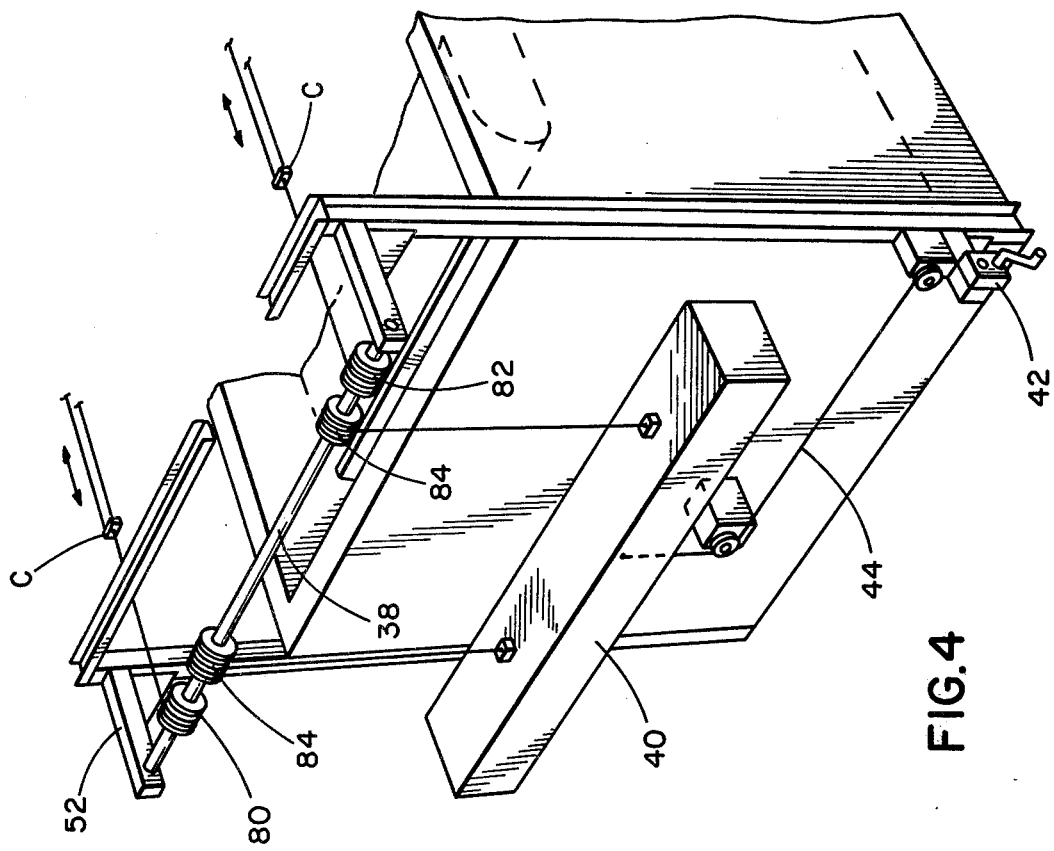
FIG. 4 is a perspective view of a third embodiment of the invention.
Figure 3:
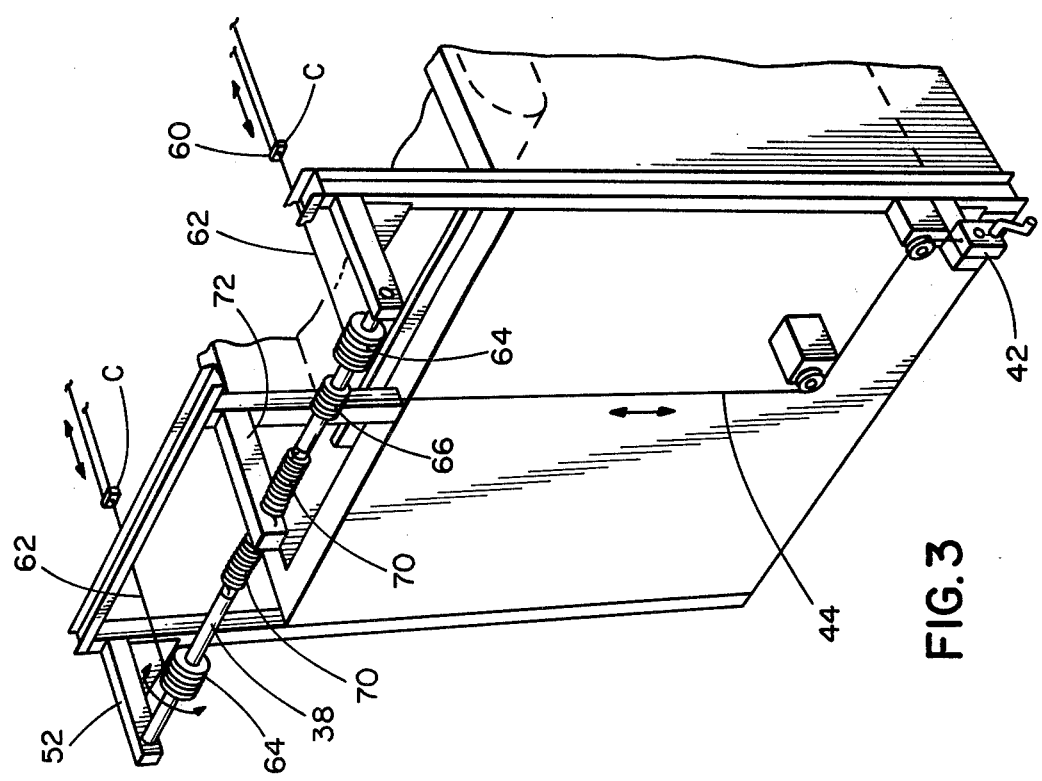
FIG. 3 is a perspective view of a second embodiment of the invention.

Referring now to FIGS. 3 and 4, two alternate embodiments of the invention are illustrated. The function performed by these embodiments is identical with the FIG. 1 embodiment but the structure for obtaining the desired results differs slightly. Referring to FIG. 3, an embodiment which dispenses with the need for counterweight 40 is illustrated. In this embodiment the cable pairs from both sides of the ice rake are again secured at point C by a cable connector 60. A single cable 62 is attached to the cable connector and is wound on cable spools 64 concentrically mounted to the shaft 38. Another spool 66 is provided for winding the winch cable 44. In this embodiment the counterbalancing function is provided by torsion springs 70 concentrically mounted on the shaft 38. One end of each spring is secured in the shaft support 72 while the remaining end is attached to the shaft in a manner so as to exert a rotational force on the shaft to oppose the force generated by the weight of the ice rake. Thus, as the ice rake is lowered in the bin the rotation of shaft 38 is opposed by the torsion springs 70. Correct sizing of these springs and pretensioning thereof results in the desired counterbalancing for the purposes set forth earlier in the specification.

While this embodiment has been described as employing cable connectors 60 with only a single cable being wound on shaft 38 it will be appreciated that a further modification is possible wherein a pair of cable spools are provided at each end of shaft 38 for winding all four cables directly on the shaft. This eliminates the need for cable connector 60 and still results in the desired configuration wherein a fixed relationship is maintained between the cables to prevent tipping of the ice rake during descent in the "free spool" condition.

Referring now to FIG. 4, a third embodiment according to the invention is illustrated. In this embodiment counterweight 40 is employed as in the first embodiment. The chain and sprockets are, however, dispensed with and instead the spooling arrangement described in connection with FIG. 3 is employed. That is, the cables from the ice rake are wound onto spools 80 and 82 by operation of winch 42. The counterweight is suspended from the shaft 38 in a similar fashion by cables which are wound on spools 84 in a direction to oppose the force created by the weight of the ice rake. Thus, when the ice rake is raised the counterweight is lowered and vice versa. As with the second embodiment the four cables for the ice rake may be joined with cable connectors, as illustrated, so that only two cables reach the shaft 38 or, if desired, two additional spools may be provided and all four cables may be wound and unwound directly on the shaft 38.

While I have shown and described embodiments of this invention in some detail, it will be understood that this description and illustrations are offered merely by way of example, and that the invention is to be limited in scope only by the appended claims.

I claim:

1. A manually controlled ice rake system for moving ice into and out of a storage bin comprising:

an ice rake including a plurality of motor driven flites for engaging ice, means for adjustably supporting said rake over the bin while maintaining it in a substantially level condition, said support means including:

(a) four cables, each cable being attached at one end thereof at a different location on the sides of said rake to support it over said bin, (b) a pair of chain segments to which the other ends of said cables are attached, the two cables for each side of said rake being connected to the same chain segment, (c) a pair of sprockets provided on a common shaft over which said segments pass, (d) winding means to which said segments are connected for raising and lowering said rake, whereby when the rake is raised and lowered it is maintained substantially level by virtue of the two cables connected to each side thereof being secured to the same chain segment and the chain segments for both sides of said rake in turn feeding over sprockets provided on said common shaft.

2. The system according to claim 1 wherein said support means further includes means for counterbalancing said rake to control the amount of force applied to the ice in said bin by said rake.

* * * * *